United States Patent

Beals

[15] 3,674,041
[45] July 4, 1972

[54] PRESSURE RESPONSIVE ACTUATOR HAVING APPLICATION TO A VALVE SPOOL OR LIKE DEVICE

[72] Inventor: Robert N. Beals, 500 E. Adams St., Plymouth, Ind. 46563

[22] Filed: May 7, 1970

[21] Appl. No.: 35,308

[52] U.S. Cl. .............................. 137/1, 91/403, 137/625.6, 251/31, 91/51
[51] Int. Cl. ....................................................F16k 11/02
[58] Field of Search .................. 137/1, 14, 625.6; 251/25, 31; 91/51

[56] References Cited

UNITED STATES PATENTS

| | | | |
|---|---|---|---|
| 2,271,169 | 1/1942 | Bottner | 251/16 |
| 2,722,234 | 11/1955 | Macgeorge et al. | 137/625.6 |
| 2,843,092 | 7/1958 | De Groff | 137/625.6 |
| 3,113,590 | 12/1963 | Olson | 137/625.6 |
| 3,145,588 | 8/1964 | King | 137/625.6 X |

FOREIGN PATENTS OR APPLICATIONS

| | | | |
|---|---|---|---|
| 951,634 | 3/1964 | Great Britain | 137/625.6 |

*Primary Examiner*—Martin P. Schwadron
*Assistant Examiner*—Irwin C. Cohen
*Attorney*—Oltsch & Knoblock

[57] ABSTRACT

A pressure responsive actuator having application to a valve spool or similar reciprocable member. The actuator includes a housing having a first chamber therein. A reciprocable member is positioned within the chamber and is shiftable from one end to the other end of the chamber. A fluid inlet is provided in the housing and has one inlet port in communication with one end of the chamber and another inlet port in communication with the other end of the chamber. A valve, which is normally closed, communicates with one end of the chamber for venting that end of the chamber when the valve is actuated. The housing defines a second chamber which is in communication with the first chamber at the opposite end of the chamber from the valve. The reciprocable member is shifted from one end to the other end of the chamber as pressurized fluid is introduced into the fluid inlet and passes simultaneously through the inlet ports into both ends of the first chamber and into the second chamber and as the valve is then actuated to vent one end of the first chamber.

3 Claims, 5 Drawing Figures

PATENTED JUL 4 1972

INVENTOR.
ROBERT N. BEALS

BY
Oltsch & Kubleck

ATTORNEYS

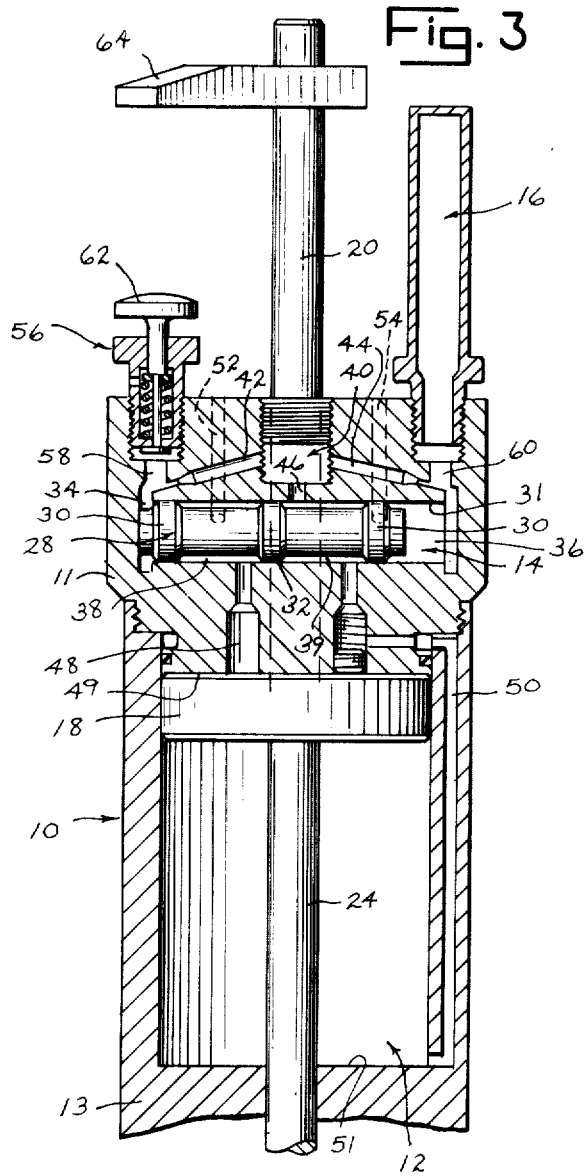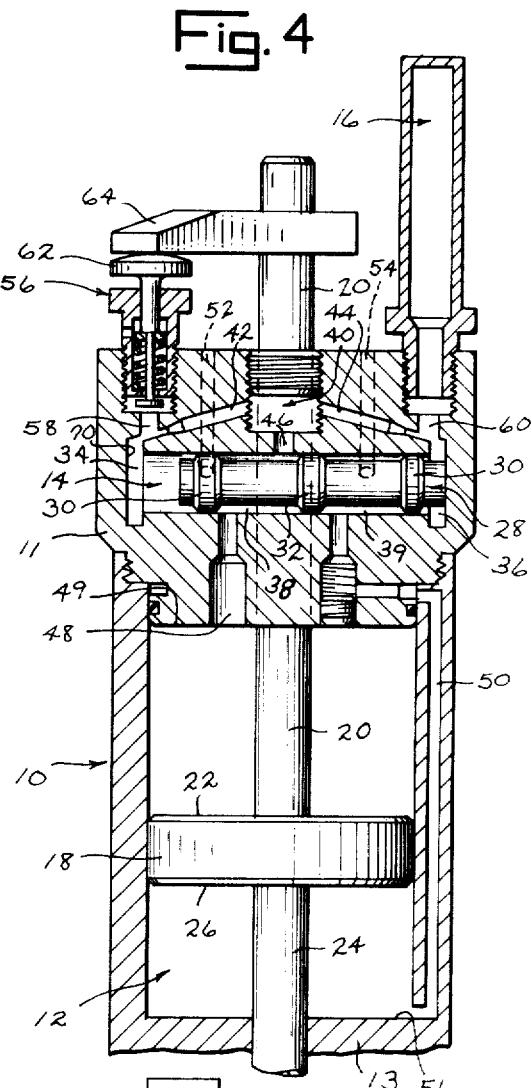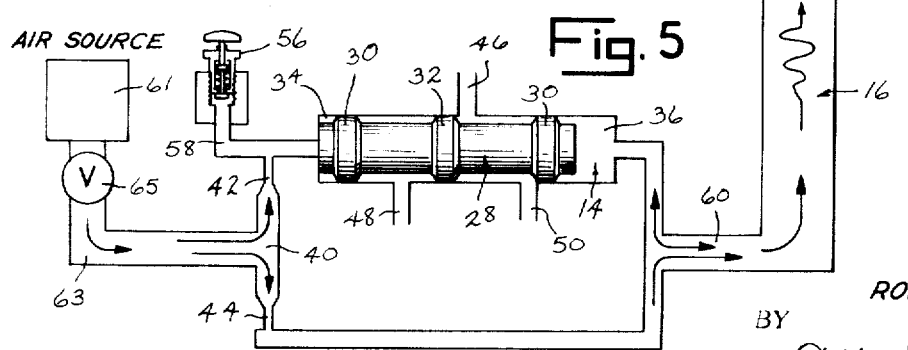

3,674,041

PRESSURE RESPONSIVE ACTUATOR HAVING APPLICATION TO A VALVE SPOOL OR LIKE DEVICE

SUMMARY OF THE INVENTION

This invention relates to a pressure responsive actuator having a reciprocable actuating member therein and has specific, although not limited, application to a valve spool shifting device.

The actuator includes a housing having a first chamber therein. A reciprocable member, such as a valve spool, is positioned within the chamber and is shiftable between a first operative position adjacent one end of the chamber and a second operative position adjacent the other end of the chamber. The housing includes a fluid inlet having one inlet port in communication with said one end of the chamber and another inlet port in communication with said other end of the chamber. A valve means which is normally closed communicates with the chamber at said one end thereof for venting the one end of the chamber when the valve means is actuated. The housing also defines a second chamber which communicates with the first chamber at said other end thereof. When a pressurized fluid, such as compressed air, is introduced into the fluid inlet and passes simultaneously through the inlet ports into both ends of the first chamber and into the second chamber, the reciprocable member is caused to be shifted from its first into its second operative position.

After the reciprocable member is shifted into its second operative position, and while fluid pressure is maintained in both the first and second chambers, the valve means is actuated so as to vent said one end of the first chamber and thereby cause the reciprocable member to be shifted from its second into its first operative position. Fluid flow is then cut off to the housing and a substantial portion of the fluid withdrawn from the first and second chambers. Where compressed air is being used as the pressurized fluid, the withdrawal of the fluid will be accomplished by venting the first and second chambers to the atmosphere. Thereafter, the pressurized fluid is again introduced through the fluid inlet ports into the first and second chambers to cause the reciprocable member to be shifted from its first into its second operative position, thereby repeating the operative cycle of the actuator.

The actuator of this invention would have application to pneumatic tools, such as air drills, wherein it is customary to utilize a valve spool device to regulate the flow of compressed air into a cylinder to cause the reciprocating movement of a piston therein which serves during its stroke to urge the drill tool into the work piece. In prior embodiments of the valve spool device for an air drill, the operator of the drill must depress a bleed valve each time he wishes the drill to cycle or the drill must be equipped with an expensive and sometimes complicated remote actuating device which would actuate the bleed valve. In this invention, the operator or remotely-actuated bleed valve has been eliminated, and through a novel arrangement of parts, the drill is caused to cycle each time the air pressure within the valve spool device is reduced to atmospheric pressure. Thus, the cycling of the drill may be accomplished by a simple valve positioned between the source of pressurized air and the valve spool device.

It is an object of this invention to provide a pressure responsive actuator having a reciprocable member which is shifted between first and second operative positions by the application of a pulsed pressurized fluid.

It is another object of this invention to provide a pressure responsive valve spool device which is of reliable operation and of economic manufacture.

It is another object of this invention to provide a method for shifting a valve spool in response to a pulsed actuating fluid.

Other objects of this invention will become apparent upon a reading of the invention's description.

BRIEF DESCRIPTION OF THE DRAWINGS

A preferred embodiment of this invention has been chosen for purposes of illustration and description wherein:

FIG. 3 is a sectional view taken along line 3—3 of FIG. 1 showing the preferred embodiment in one operative position.

FIG. 4 is a sectional view similar to FIG. 3 showing the preferred embodiment in a second operative position.

FIG. 5 is a schematic view of the preferred embodiment of this invention.

DESCRIPTION OF THE PREFERRED EMBODIMENT

Figure 1:
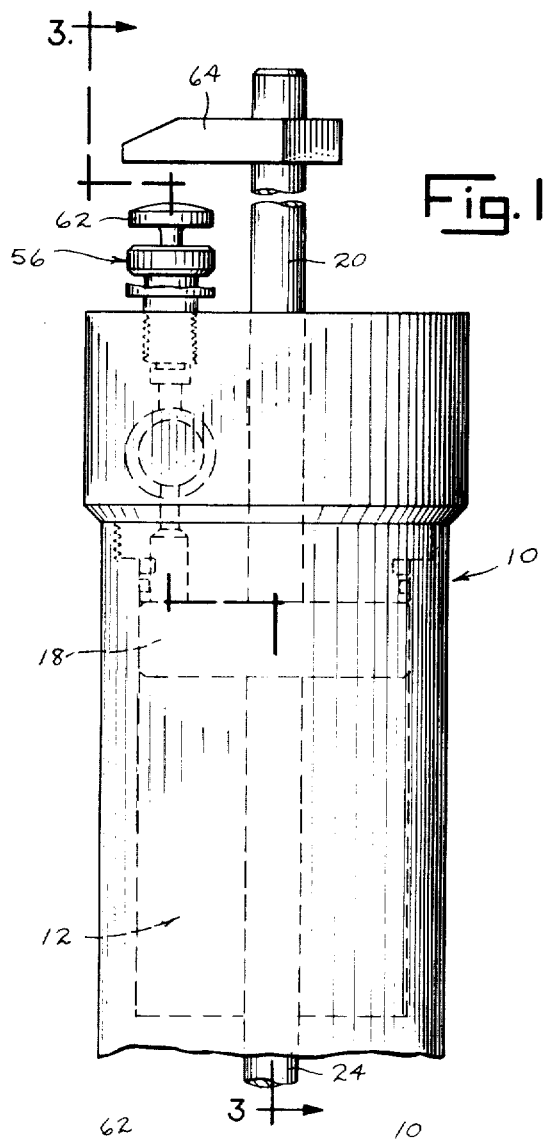
FIG. 1 is an elevational view of the preferred embodiment of this invention.
Figure 2:
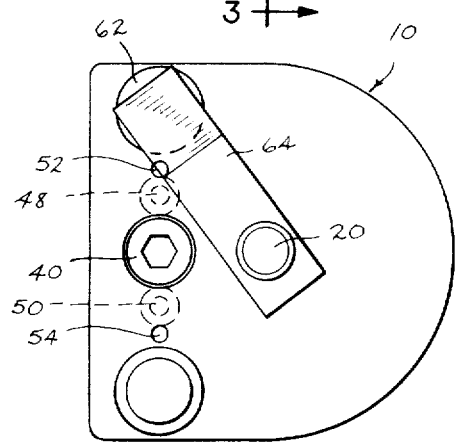
FIG. 2 is a top plan view of the preferred embodiment shown in FIG. 1.

The preferred embodiment illustrated is not intended to be exhaustive or to limit the invention to the precise form disclosed. It is chosen and described in order to best explain the principles of the invention and its application and practical use to thereby enable others skilled in the art to best utilize the invention.

The embodiment illustrated includes a housing 10 which defines a large cylindrical chamber 12 and smaller chambers 14 and 16. A piston 18 is shiftably carried within chamber 12. A rod 20 projects axially from side 22 of piston 18 and through a bore in one end 11 of housing 10. Another rod 24 projects axially from side 26 of piston 18 and through a bore in the opposite end 13 of housing 10. End 13 of the housing may form an integral part of the housing of an air drill with the opposite end (not shown) of rod 24 connected to the tool of the drill so as to apply an axially directed thrust to the tool.

A reciprocable valve spool 28 is positioned within chamber 14. Valve spool 28 includes piston parts 30 adjacent the ends thereof and a land part 32 positioned between piston parts 30. Piston parts 30 and land part 32 make sliding contact with the side wall 31 of chamber 14 as spool 28 moves from one end 34 to the other end 36 of chamber 14. Land part 32 and piston parts 30 cooperate with the side wall of chamber 14 to define spaced fluid-distributing grooves 38 and 39.

Housing 10 includes a fluid inlet 40 having a port 42 which communicates with end 34 of chamber 14, a port 44 which communicates with end 36 of chamber 14, and a port 46 which communicates with chamber 14 between the ends thereof. Housing 10 also includes passages 48 and 50 which interconnect chambers 12 and 14. Passage 48 has one end opening into chamber 14 between end 34 thereof and fluid inlet port 46 and its other end opening into chamber 12 at wall 49 thereof to one side of piston 18. Passage 50 has one end opening into chamber 14 between end 36 thereof and fluid inlet port 46 and has its other end opening into chamber 12 adjacent wall 51 thereof at the opposite side of piston 18. Housing 10 also includes exhaust ports 52 and 54 which open into chamber 14. Exhaust port 52 is positioned between chamber end 34 and the opening of fluid passage 48 in chamber 14. Exhaust port 54 is positioned between chamber end 36 and the opening of fluid passage 50 in chamber 14.

A bleed valve 56 is mounted to housing 10 and is interconnected to end 34 of chamber 14 by a port 58. Chamber 16 is interconnected to end 36 of chamber 14 by a port 60. Bleed valve 56 is of a conventional construction and includes a spring biased actuator button 62 which, when depressed, opens the valve and vents end 34 of chamber 14 to the atmosphere. Rod 20 carries an arm part 64 which is adapted to engage button 62 of bleed valve 56 when piston 18 is shifted within chamber 12 from the position illustrated in FIG. 3 to the position illustrated in FIG. 4. Referring to FIG. 5, a fluid source 61, such as a tank of compressed air, is connected by a suitable conduit 63 to fluid inlet 40. A valve 65 serves to regulate the flow of pressurized air from the source 61 into fluid inlet 40. Valve 65 is of the type which, when cutting off the flow of air from source 61 into inlet 40, causes inlet 40, and thus connected chambers 14 and 16, to be opened or vented to the atmosphere through the valve.

To illustrate the operational sequence of this invention, it will be assumed that the compressed air from the pressure source 61 has been cut off by the valve 65 and that chambers 12, 14 and 16 of housing 10 are at atmospheric pressure. Valve spool 28 is positioned at end 34 of chamber 14, as illustrated in FIG. 3. The valve spool and the housing are so designed that with the spool positioned at chamber end 34, fluid inlet port 46 is placed in communication with passage 50 by means of fluid distributing groove 39 and exhaust port 52 is placed in communication with passage 48 by means of fluid distributing groove 38. Exhaust port 54 is sealed by a piston part 30 of the spool. Piston 18 is positioned against wall 49 of chamber 12 as illustrated in FIG. 3. Fluid inlet ports 42 and 44 are sized so that the flow rate of pressurized air therethrough into chamber ends 34 and 36 will be substantially equal. Valve 65 serving to isolate pressurized air source 61 from housing 10 is opened to permit the compressed air to flow into fluid inlet 40 and simultaneously through ports 42 and 44 thereof. Since the air flows at an equal rate into ends 34 and 36 of chamber 14 and because the air flowing into end 36 of the chamber must additionally fill chamber 16, the pressure within end 34 of the chamber increases at a faster rate than the pressure in chamber end 36 and thereby causes the spool 28 to be shifted into end 36 of chamber 14, as shown in FIG. 4.

After the spool has shifted to end 36 of the chamber 14, the air pressure at the respective ends of the chamber will become equalized and thus permit the spool to assume a position of rest. The valve spool and housing are so designed that when spool 28 is shifted to end 36 of chamber 14, fluid inlet port 46 is placed in communication with passage 48 by means of fluid distributing groove 38 so as to permit air to flow into chamber 12 and contact face 22 of piston 18, thus causing the piston to shift into the position illustrated in FIG. 4 adjacent chamber wall 51. Exhaust port 54 is placed in communication with passage 50 by means of fluid distributing groove 39. Exhaust port 52 is closed by a piston part 30 of the spool. As piston 18 approaches wall 51 of chamber 12, arm part 64 contacts button 62 of bleed valve 56 and thus opens the valve to vent end 34 of chamber 14 to the atmosphere. This action creates an imbalance of pressure upon the adjacent piston 30 of spool 28 since end 36 of chamber 14 is pressurized, and thus causes valve spool 28 to be shifted to end 34 of chamber 14 where it resumes the position shown in FIG. 3. As previously explained, as spool 28 is positioned at chamber end 34, fluid inlet port 46 is placed in communication with passage 50. This causes piston 18 to shift to its position shown in FIG. 3, thus releasing button 62 of bleed valve 56 and thereby closing the valve.

Valve 65 located between air source 61 and housing 10 is now actuated, either manually or by remote means, to isolate the air source from the housing and to vent chambers 14 and 16 to the atmosphere. Once chambers 14 and 16 reach or approach atmospheric pressure, valve 65 is again actuated to introduce compressed air into chambers 14 and 16 through fluid inlet ports 42 and 44 and to thereby cause valve spool 28 to be shifted from end 34 to end 36 of chamber 14. Thus the operational sequence of the invention is again started and is repeated each time chambers 14 and 16 are vented to the atmosphere.

To assure that valve spool 28 is shifted from end 34 to end 36 of the chamber when the compressed air is introduced into chambers 14 and 16, it is preferable to design the valve spool and chambers 14 and 16 so that the volume in chamber 14 between the end wall 70 of the chamber at end 34 thereof and spool 28 when the spool is positioned as shown in FIG. 4, including the volume of port 58 of valve 56, is considerably less than the volume of chamber 16. This arrangement, in conjunction with the equal fluid flow rate through inlet ports 42 and 48, will assure that the fluid pressure within chamber end 34 will exceed the fluid pressure at chamber end 36 as the fluid is introduced into the chamber ends and thus cause the spool to be shifted to chamber end 36.

Although pressurized air is utilized as the working fluid in the illustrated embodiment, it is to be understood that a liquid, such as oil, could also be used. When utilizing a relatively incompressible fluid such as oil, it is preferable to provide means for preventing an air lock within chamber 16. This could be accomplished by constructing the side walls of the chamber of an elastic material which would permit the chamber to expand to a specified volumetric limit when the oil is introduced into the end 36 of chamber 14. Means would also have to be provided for withdrawing the oil from chambers 14 and 16, since, unlike a compressible fluid such as air, the mere venting of the chambers would not serve to ready the chambers for the next pulse of fluid. One could also design chamber 16 with rigid side walls and a movable spring biased piston-like end wall which would allow the volume of the chamber to increase as the oil is introduced therein and which would assist in causing the withdrawal of the oil from the chamber.

It is to be understood that the invention is not to be limited to the details herein given, but may be modified within the scope of the appended claims.

I claim:

1. A method of shifting a valve spool having ends of equal effective area from one end to the other end of a first chamber, comprising the steps:

a. providing a second chamber in communication with said other end of the first chamber wherein the combined volumes of said second chamber and said other end outwardly of the valve spool exceeds the volume of said one end outwardly of the valve spool in all operative positions of the spool, b. introducing a fluid under pressure simultaneously and at substantially the same flow rate into said one end of the first chamber and one of said other end of the first chamber and said second chamber and thereby causing said valve spool to be shifted to said other end of the first chamber, c. venting said one end of the first chamber while maintaining fluid flow into said one of the other first chamber end and the second chamber and thereby causing said valve spool to be shifted to said one end of the first chamber, d. withdrawing at least a portion of said fluid from the ends of said first chamber and from said second chamber, and e. repeating Step b and thereby causing the valve spool to be shifted to said other end of the first chamber.

2. A valve assembly responsive to a pressurized fluid comprising a housing having a chamber therein with first and second ends, a valve spool having piston-like end portions of equal effective area carried within said chamber and being axially shiftable between said first and second ends therein, said valve spool having a first operative position wherein one end portion of said spool is located adjacent said first chamber end and a second operative position wherein the other end portion of said spool is located adjacent said second chamber end, a fluid inlet including an inlet port in communication with said chamber outwardly of said one end portion of said spool in all operative positions thereof and another inlet port in communication with said chamber outwardly of said other end portion of said spool in all operative positions thereof, said inlet ports being sized so that the fluid flow rate through said ports is substantially equal, said one spool end and said first chamber end defining a first fluid receiving volume, fluid receiving means in communication with said chamber at its said second end defining in cooperation with said chamber a second fluid receiving volume located outwardly of said other spool end portion which is greater than the first fluid receiving volume located outwardly of said one spool end in all operative positions of said valve spool so as to enable said spool to be shifted from said first operative position into said second operative position when said fluid is introduced into said fluid inlet and simultaneously through said ports into said chamber, valve means normally closed communicating with said chamber outwardly of said one spool end portion for venting that part of said chamber which is outwardly of said one spool end portion, said spool being shiftable from its second operative position into its first operative position when said valve means is actuated.

3. A method of shifting a valve spool having first and second ends of equal effective area from one end to the other end of a chamber, comprising the steps:
   a. providing said other end of the chamber with a fluid-receiving volume located outwardly of the first end of said valve spool which exceeds the fluid-receiving volume located outwardly of the second end of said spool at said one end of said chamber in all operative positions of said spool,
   b. introducing a fluid under pressure simultaneously and at substantially the same flow rate into said one and other ends of the chamber and thereby causing said valve spool to be shifted to said other end of the chamber,
   c. venting said one end of the chamber while maintaining fluid flow into said other chamber end and thereby causing said valve spool to be shifted to said one end of the chamber,
   d. withdrawing at least a portion of said fluid from the ends of said chamber, and
   e. repeating Step *b* and thereby causing the valve spool to be shifted to said other end of the chamber.

* * * * *